United States Patent [19]
Schaut

[11] Patent Number: 5,649,419
[45] Date of Patent: Jul. 22, 1997

[54] ROTATING ACOUSTICALLY LINED INLET SPLITTER FOR A TURBO-FAN ENGINE

[75] Inventor: Larry A. Schaut, Renton, Wash.

[73] Assignee: The Boeing Company, Seattle, Wash.

[21] Appl. No.: 379,148

[22] Filed: Jan. 27, 1995

[51] Int. Cl.⁶ .................... F02K 3/02; F04D 29/66
[52] U.S. Cl. .................. 60/226.1; 181/214; 415/119
[58] Field of Search .................. 60/226.1, 725; 415/119; 181/214, 222

[56] References Cited

U.S. PATENT DOCUMENTS

| | | | |
|---|---|---|---|
| 3,477,231 | 11/1969 | Paulson | 415/119 |
| 3,494,539 | 2/1970 | Littleford | |
| 3,729,957 | 5/1973 | Petrie et al. | 60/226 |
| 3,735,593 | 5/1973 | Howell | 60/226 |
| 3,948,346 | 4/1976 | Schindler | 415/119 |
| 4,012,165 | 3/1977 | Kraig | 415/145 |
| 4,240,250 | 12/1980 | Harris | 415/119 |
| 4,969,326 | 11/1990 | Blessing et al. | 60/226.1 |

FOREIGN PATENT DOCUMENTS

| | | | |
|---|---|---|---|
| 2328460 | 1/1975 | Germany | 60/226.1 |

*Primary Examiner*—Michael Koczo
*Attorney, Agent, or Firm*—Christensen O'Connor Johnson & Kindness PLLC

[57] ABSTRACT

A noise controlling device (12) is used for controlling noise in a turbo-fan engine (10). The engine includes an entrance (22) for ingesting air, and a fan rotor (18) connected to a spinner (20) in the interior of the engine. The fan rotor faces the forward side of the engine. A ring (24) is connected to the interior of the engine, with the ring being located between the engine entrance and the forward side of the fan rotor. The inner periphery of the ring faces the spinner, with the ring surrounding the spinner in substantial coaxial alignment therewith. An acoustic lining (26) is disposed around the inner and outer peripheries of the ring.

15 Claims, 4 Drawing Sheets

ROTATING ACOUSTICALLY LINED INLET SPLITTER FOR A TURBO-FAN ENGINE

FIELD OF THE INVENTION

The present invention relates to aircraft engines, and more particularly to methods and devices for controlling noise generated by aircraft engines.

BACKGROUND OF THE INVENTION

Noise generated by aircraft is an important problem. Aircraft noise is unpleasant for aircraft passengers, and for persons in the vicinity of aircraft. Aircraft noise is also unpleasant for persons around airports, including those in the flight paths leaving or approaching airports. The problem of aircraft noise is so significant that federal regulations directed to limiting the noise that may be generated by individual aircraft have been enacted. As airports and communities become more congested, more demanding regulations can be expected, making it more difficult for aircraft to meet the regulations.

The majority of the noise generated by an aircraft is produced by aircraft engines. Modern aircraft used for commercial transportation over relatively long distances almost exclusively employ turbo-fan jet engines, namely, high by-pass turbo-fan jet engines.

Air flow entering a high by-pass turbo-fan jet engine, is divided into a primary air flow that passes through the engine core, and a secondary air flow that flows around, or "by-passes" the engine core. A significant amount of noise is believed to emanate from the primary air flow as it passes from the fan rotor through the low compressor inlet guide vanes of a high by-pass turbo-fan jet engine. Additional noise is believed to emanate from the primary flow as it passes from the low compressor inlet guide vanes, through the low compressor rotor.

Past attempts to control noise in high by-pass and other types of turbo-fan engines have generally been directed to acoustically lining the engine nacelle. Unfortunately, acoustic lining has little effect on noise emanating from the primary air flow through the engine core because the acoustic lining is spaced too far away from this significant noise source to be effective. Further, acoustic lining in the nacelle does not impede the path of acoustic waves forward emanating from the engine interior. The present invention provides an improved solution for controlling noise emanating forward from the interior of high by-pass and other types of turbo-fan jet engines.

SUMMARY OF THE INVENTION

In accordance with the present invention, a noise controlling device for controlling noise in high by-pass and other types of turbo-fan jet engines is provided. Turbo-fan jet engines include an entrance for ingesting air, and a fan rotor connected to a spinner in the interior of the engine that faces the forward side of the engine. The noise controlling device includes a ring mounted in the interior of the engine between the engine entrance and the forward side of the fan rotor. The inner periphery of the ring faces the spinner and the ring surrounds the spinner in substantial coaxial alignment therewith. An acoustic lining is disposed around the inner periphery of the ring.

In accordance with further aspects of this invention, the ring includes an outer periphery. An acoustic lining is also disposed around the outer periphery of the ring.

In accordance with other aspects of this invention, a plurality of struts connect the ring to the spinner.

In accordance with yet other aspects of this invention, the fan rotor includes a plurality of blades, each blade having a leading edge and a trailing edge. The leading edge of each fan blade is nearer to the engine entrance than the trailing edge. Additionally, each strut includes a leading edge, and a trailing edge, with the leading edge of each strut nearer to the engine entrance than the trailing edge. The struts are connected to the spinner so that the trailing edge of each strut is adjacent the leading edge of a fan blade.

In accordance with still further aspects of this invention, the ring includes a forward lip extending axially forward of the struts towards the engine entrance.

In accordance with additional aspects of this invention, a method of controlling noise in a turbo-fan engine is also provided, wherein the turbo-fan engine includes a nacelle housing a spinner and a fan rotor. The method includes the steps of providing a ring having an inner periphery; positioning the ring in the interior of the engine a spaced-apart distance from the engine nacelle; connecting the ring to the engine; and lining the inner periphery of the ring with an acoustic material.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
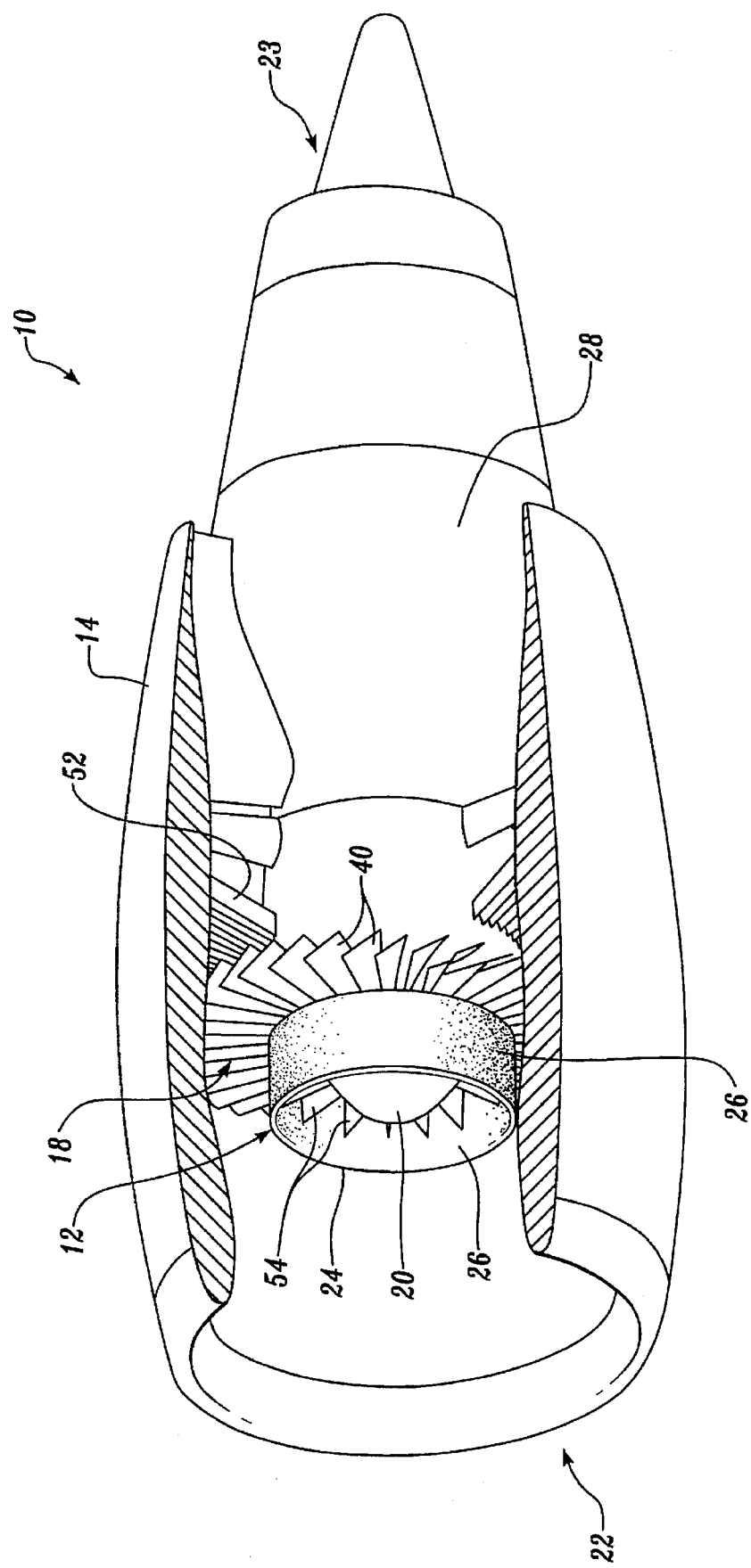
FIG. 1 is a perspective view of a turbo-fan engine having part of the nacelle cut away to illustrate a rotating acoustically lined inlet splitter formed in accordance with the present invention.

FIG. 1 illustrates a high by-pass turbo-fan jet engine 10 having an acoustically lined inlet splitter 12 formed in accordance with the present invention. The inlet splitter 12, also termed a noise controlling device, controls forward emanating noise generated by the engine 10.

The engine 10 includes a nacelle 14 surrounding a fan rotor 18 connected to a spinner 20. Part of the nacelle 14 is shown cut-way to reveal the position of the spinner 20 and the fan rotor 18 in the interior of the engine 10. The spinner 20 and the fan rotor 18 both face the entrance 22 of the engine. Air is drawn into the engine 10 through the entrance 22, and exhausted through a nozzle 23 located at the aft end of the engine to generate the thrust used to propel an aircraft.

The inlet splitter 12 includes a ring 24. A sound-absorbing, acoustic lining 26 is disposed around the inner and outer peripheries of the ring 24. Preferably, the ring 12 is formed of a metal alloy commonly used in aircraft construction, such as an aluminum, or titanium alloy.

The ring 24 is positioned in the engine interior adjacent the forward side of the fan rotor 18, substantially coaxially surrounding the spinner 20. The radius of the ring 24 is sized so that the ring is spaced a distance apart from both the spinner 20 and the engine nacelle 14.

Figure 2:
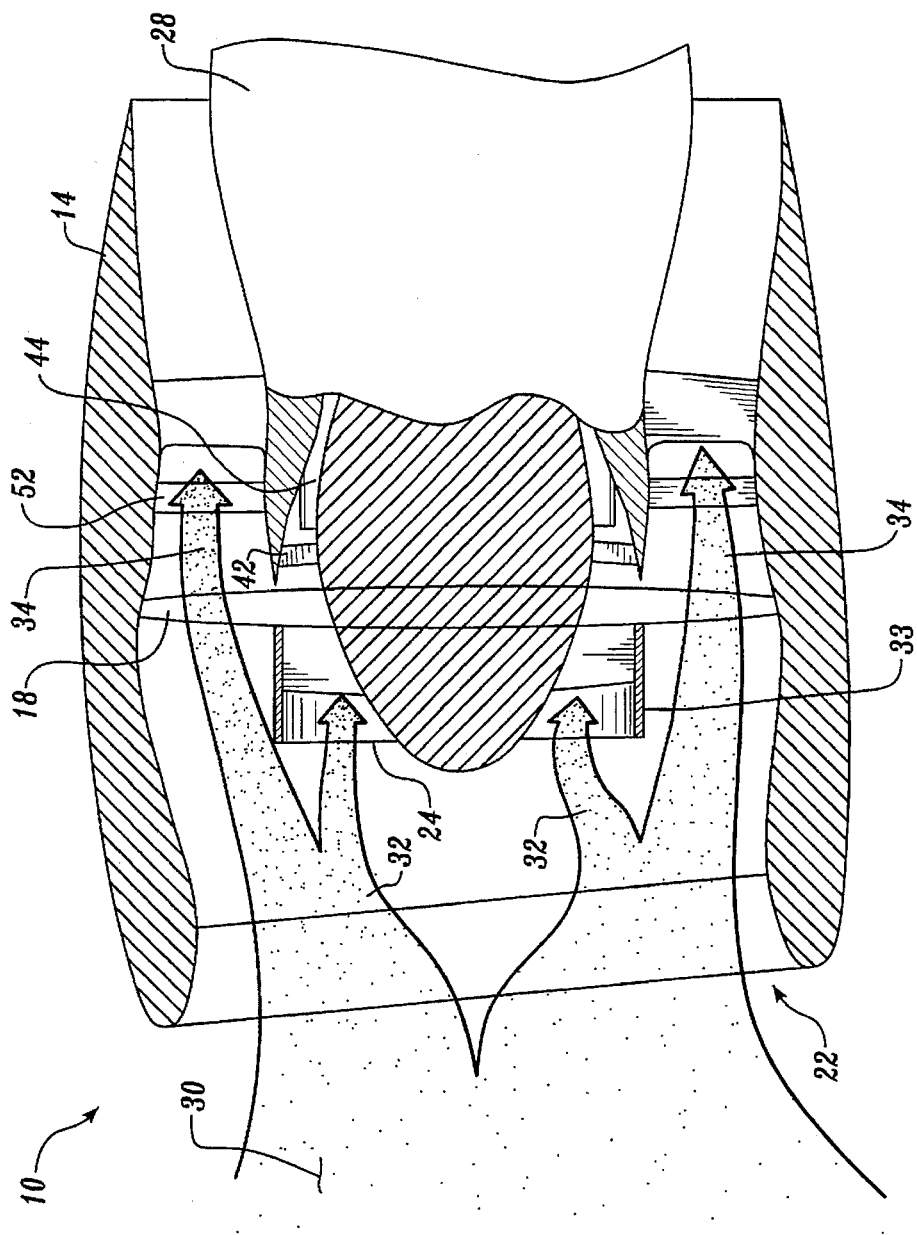
FIG. 2 is a partial cross-sectional diagram of the engine of FIG. 1.

More particularly, the engine 10 includes a core 28 located along the central axis of the engine. Referring to FIG. 2, when the engine is operating a combined air flow 30 is drawn into the engine entrance 22. After the combined air flow 30 is drawn into the engine 10, it divides into a primary flow 32, and a secondary flow 34 at a radial distance surrounding the central axis of the engine 10. The primary flow 32 passes through the engine core 28, while the secondary flow 34 flows around, or "by-passes" the core 28.

The radius of the ring 24 is sized such that the radius is approximately equal to the radial distance where the combined flow 30 divides into a primary flow 32 and a secondary flow 34. Hence, the diameter of the ring 24 is approximately equal to the diameter of the entrance to the engine core 28. The length of the ring 24 is sized such that the forward lip 33 of the ring is positioned approximately at the axial location where the combined flow 30 divides into the primary flow 32, and the secondary flow 34, when the trailing end of the ring is positioned adjacent the forward side of the fan rotor 18. Thus, the primary flow 32 passes through the ring 24, while the secondary flow 34 passes around the ring. The ring therefore serves to help "split" the flow 30 entering the engine inlet.

Figure 4:
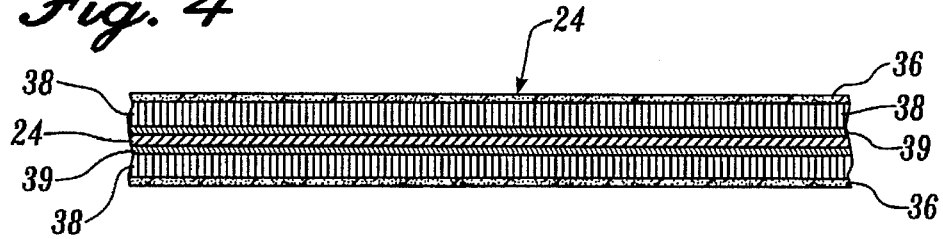
FIG. 4 is a schematic diagram illustrating an acoustic lining.

The acoustic lining 26 disposed around the inner and outer peripheries may be a conventional type of single or double layer acoustic lining used in turbo-fan jet engines, or other type of acoustic lining. FIG. 4 illustrates a conventional single layer type of acoustic lining mounted on both sides of the ring 24. The illustrated single layer type acoustic lining includes an outside layer 36 in the form of a perforated sheet. Adjacent the outside layer is an interior layer 38 formed of a honeycomb material. Finally, a solid supporting sheet 39 is located adjacent the other side of the interior (honeycomb) layer 38. As shown in FIG. 4, preferably, the acoustic lining 26 is disposed around both the inner and the outer peripheries of the ring 24, with the perforated layer 36 arranged so that it forms the outermost sheet.

Acoustic waves enter the lining primarily through the perforations in the outside layer 36. Once inside the lining 26, the acoustic waves are trapped by the interior honeycomb layer 38, and converted to non-acoustic thermal energy.

Figure 4A:
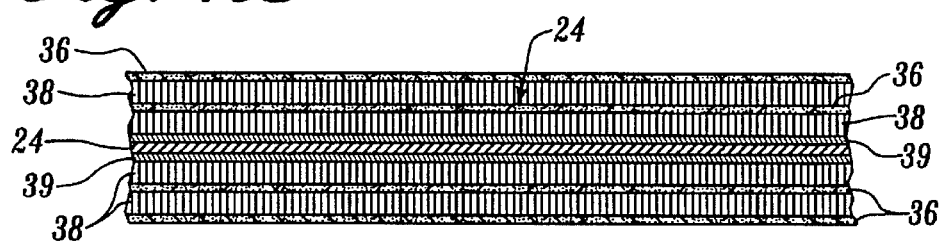
FIG. 4A is a schematic diagram illustrating another acoustic lining.

In a conventional double layer type of acoustic lining as shown in FIG. 4A, a second perforated sheet 36, and a second honeycomb layer 38 are disposed between the solid sheet 39 and the first honeycomb layer 38. A double layer acoustic lining generally has better sound-absorbing qualities, but typically has the disadvantage of added weight.

The acoustic lining 26 absorbs noise generated within the interior of the engine 10. Specifically, the fan rotor 18 includes a plurality of fan blades 40 as shown in FIG. 1 that rotate about the central axis of the engine 10 during operation of the engine. Rotation of the fan blades 40 serves to draw the combined air flow 30 into the entrance 22 of the engine 10. As discussed above, after the combined air flow 30 enters the engine 10, the air flow separates into a primary air flow 32 passing through the engine core 28, and a secondary air flow 34 that flows around the engine core.

Figure 3:
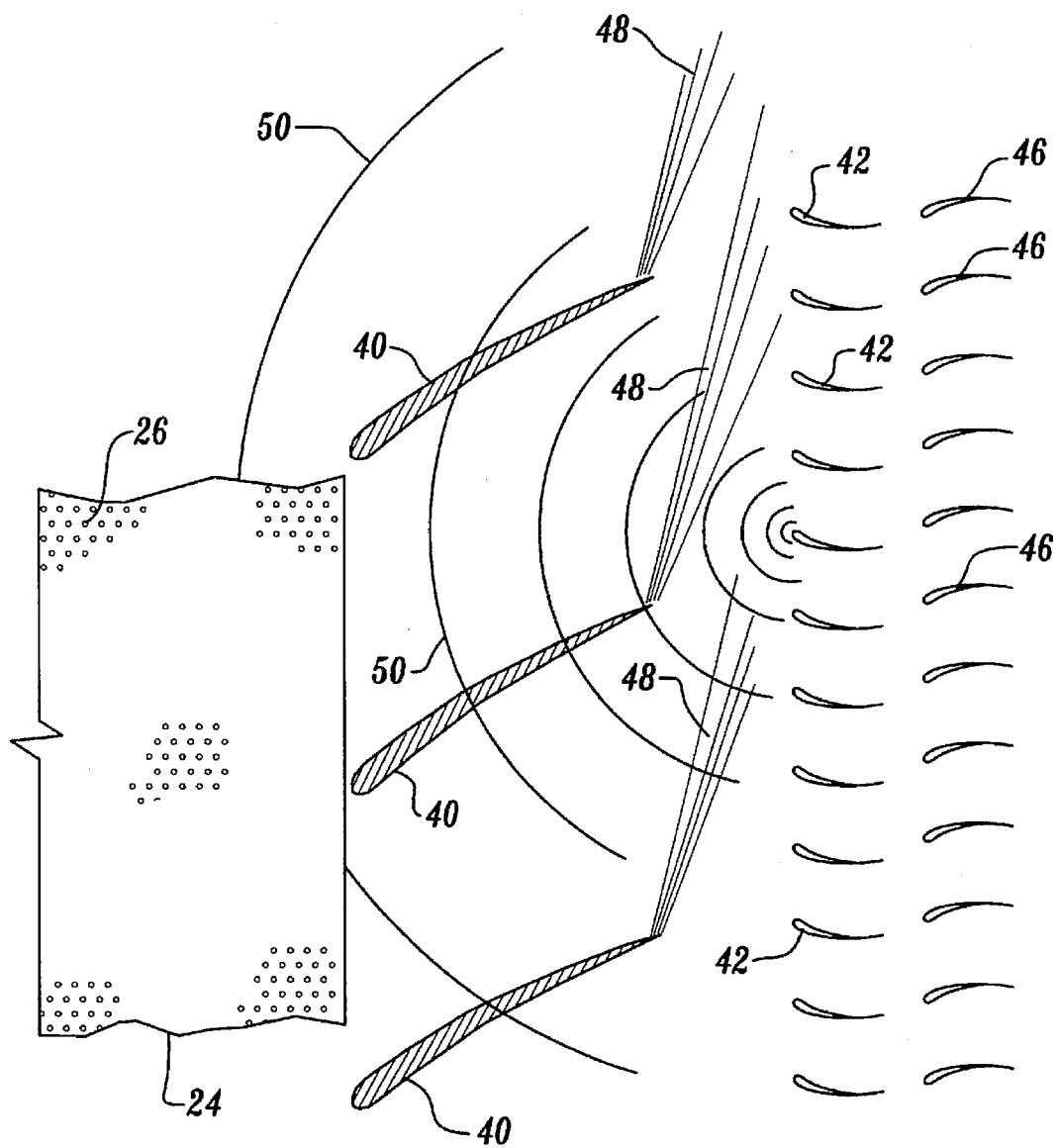
FIG. 3 is a pictorial diagram illustrating the generation of noise in the primary flow of the engine of FIG. 1.

Referring to FIG. 2, the primary air flow 32 passes through the fan rotor 18, and then through the stationary compressor inlet guide vanes 42, which are positioned near the entrance to the engine core 28. Thereafter, the primary air flow 32 passes through the compressor rotor 44 located in the engine core 42. The compressor rotor 44 comprises a plurality of compressor rotor blades 46 that are shown in FIG. 3, but not in FIG. 2. More particularly, FIG. 3 is a pictorial, radial cross-sectional diagram through several fan rotor blades 40, inlet compressor guide vanes 42, and compressor rotor blades 46.

As the primary flow 32 passes through the fan rotor 18, each of the fan blades 40 creates a wake 48 in the flow. The wake 48 impacts the inlet compressor guide vanes 42 and the compressor rotor blades 46. The interaction between the wake 48 and the compressor guide vanes 42 and the rotor blades 46 creates acoustic waves 50.

Wakes (not shown) are also induced in the secondary flow 34 as it passes through the fan blades 40 of the fan rotor 18. The wakes interact with the fan exit guide vanes 52 shown in FIGS. 1 and 2 to create acoustic waves similar to the acoustic waves 50 generated in the primary flow 32, as discussed above. Because fan exit guide vanes 52 are further away from the fan rotor 18 than the compressor inlet guide vanes 42 as shown in FIG. 2, the acoustic waves created by the action of wakes in the secondary flow 34 are not as powerful as the acoustic waves 50 created by the action of wakes in the primary flow 32.

The above-described acoustic waves are an important source of noise in the area forward of the engine. Past attempts to absorb these acoustic waves have been limited to acoustically lining the nacelle 14. However, this is ineffective for two principal reasons.

First, the more powerful acoustic waves are generated by the primary air flow 32. Acoustic lining disposed on the nacelle 14 is spaced a significant distance away from the primary air flow and, thus, a significant distance away from the more powerful acoustic waves that are generated in the engine core 28. The effectiveness of a blanketing acoustic absorption material rapidly decreases as the absorption material is moved further away from the source of the acoustic waves to be absorbed. Hence, acoustic lining on the nacelle 14 is ineffective at absorbing the acoustic waves 50 generated in the primary air flow 32 because the lining is spaced a significant distance away from the primary air flow.

Second, no absorption material is located in the path of the acoustic waves in the area forward of the engine. Thus, the acoustic waves have a free path of travel out of the engine entrance.

The acoustically lined ring 24 addresses both of these problems. The ring 24 is positioned near the source of the more powerful acoustic waves, and thus is effective at absorbing these waves. Additionally, the ring prevents the waves from having a free path of travel out of the engine entrance 22. As the acoustic waves 50 propagate forward through the engine 10, the waves encounter the acoustic lining 26 on the ring 24, and are at least partially absorbed. Waves generated in the primary air flow 32 are absorbed primarily by the lining 26 on the inner periphery of the ring 24, while waves generated in the secondary flow 34 are absorbed primarily by the lining on the outer periphery of the ring.

Figure 5:
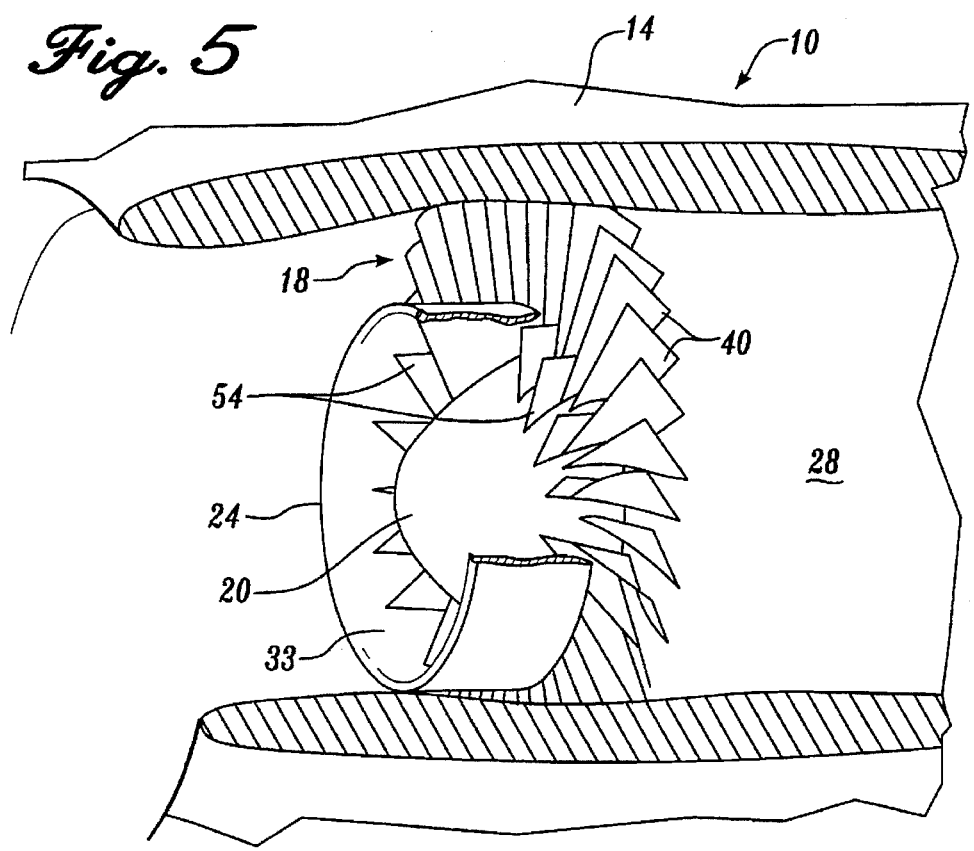
FIG. 5 is a partial perspective view of the inlet splitter and engine of FIG. 1 with part of the inlet splitter and nacelle cut away.

The ring 24 is supported by a plurality of evenly spaced struts 54 extending from the inner periphery of the ring 24 to the spinner 20 as shown in FIG. 5. Each strut 54 is aerodynamically contoured so as to minimize adverse impact on the efficiency of the engine 10. Preferably, each strut 54 is aerodynamically aligned with a fan blade 40 so that each strut acts as an extension of a fan blade. In particular, the trailing edge of each strut 54 is positioned so it is adjacent the leading edge of a fan blade 40.

In this regard, the width of each strut 54 is limited because there is a maximum width a fan blade 40 can extend to, without having a significant adverse impact on the efficiency of the engine 10. For this reason, the width of each strut 54 is less than the width of the ring 24. As shown in FIGS. 2 and 5, preferably, the lip portion 33 of the ring extends forward of the leading edge of the struts 54.

In the preferred embodiment, the number of struts 54 is limited to the number required to structurally support the ring 24 with an adequate safety margin. This means that most engines will require generally fewer struts 54 than there are engine fan blades 40.

There is an important advantage in mounting the ring 24 to the spinner 20 with the struts 54. In this configuration the struts 54 rotate with the spinner 20 at the same rate as the fan blades 40. Further, each strut 54 is aligned with a fan blade 40. Thus, the struts do not create additional wakes that could impact the fan blades 40 and create more noise.

Preferably, the ring 24 is not attached to the fan blades 40. Thus, individual fan blades 40 can be replaced as necessary, without requiring separation from the ring 24. Additionally, by not attaching the ring to the fan blades 40, the acoustically lined inlet splitter can be more readily retrofitted to existing turbo-fan jet engines. While this arrangement is presently preferred, it is to be understood that in alternate embodiments, the ring 24 may be attached to the fan blades 40.

While the preferred embodiment of the invention has been illustrated and described, it will be appreciated that within the scope of the appended claims, various changes can be made therein without departing from the spirit and scope of the invention.

The embodiments of the invention in which an exclusive property or privilege is claimed are defined as follows:

1. A noise controlling device for controlling noise in a turbo-fan engine, the engine having an entrance for ingesting air, a fan rotor connected to a spinner in the interior of the engine, the fan rotor including a forward side facing the engine entrance, the noise controlling device comprising:

(a) a ring connected to the spinner and surrounding the spinner in substantial coaxial alignment therewith, the ring being located between the engine entrance and the forward side of the fan rotor, and having an inner periphery facing the spinner;

(b) an acoustic lining disposed around the inner periphery of the ring;

(c) a plurality of struts that connect the ring to the spinner:

(d) the fan rotor including a plurality of blades, each blade having a leading edge and a trailing edge, the leading edge being nearer to the engine entrance than the trailing edge, wherein each strut includes a leading edge and a trailing edge, the leading edge of each strut being nearer to the engine entrance than the trailing edge of each strut, wherein the trailing edge of each strut is adjacent the leading edge of a fan blade.

2. The noise controlling device of claim 1, including an acoustic lining disposed around the outer periphery of the ring.

3. The noise controlling device of claim 2, wherein the second acoustic lining is a single-layer acoustic lining.

4. The noise controlling device of claim 2, wherein the second acoustic lining is a double-layer acoustic lining.

5. The noise controlling device of claim 1, wherein the engine includes a core, and a combined air flow entering the engine entrance when the engine is operating, the combined air flow being divided into a primary air flow passing through the core, and a secondary air flow bypassing the core, wherein the ring is spaced a radial distance away from the spinner, and includes a forward lip for splitting the primary air flow and the secondary air flow so that the primary flow passes through the ring, and the secondary flow passes around the ring.

6. The noise controlling device of claim 1, wherein the engine includes a core located in the interior of the engine, the core having a generally circular entrance, wherein the diameter of the inner periphery of the ring is approximately equal to the diameter of the entrance of the core.

7. The noise controlling device of claim 8, wherein the ring includes a forward lip extending axially forward of the struts towards the engine entrance.

8. The noise controlling device of claim 1, wherein the acoustic lining is a single-layer acoustic lining.

9. The noise controlling device of claim 1, wherein the acoustic lining is a double-layer acoustic lining.

10. The noise controlling device of claim 1, wherein the ring is located adjacent the forward side of the fan rotor.

11. A method of controlling noise in a turbo-fan engine, the turbo-fan engine having a nacelle housing a spinner and a fan rotor, the engine including an entrance for ingesting air, the fan rotor having a plurality of blades and including a forward side facing the engine entrance, the method comprising:

(a) providing a ring between the engine entrance and the forward side of the fan rotor, the ring having an inner periphery;

(b) positioning the ring in the interior of the engine a spaced-apart distance from the engine nacelle;

(c) connecting the ring to the spinner with a plurality of struts;

(d) lining the inner periphery of the ring with an acoustic material; and (e) aerodynamically aligning each strut with a blade of the fan rotor.

12. The method of claim 11, further comprising the step of lining the outer periphery of the ring with an acoustic material.

13. The method of claim 11, wherein the step of connecting the ring to the engine comprises the substep of positioning the ring to generally coaxially surround the spinner.

14. The method of claim 11, wherein the engine includes a central axis, a core and an entrance having a combined air flow entering the engine entrance when the engine is operating, the combined air flow being divided at a radial distance surrounding the central axis of the engine into a primary air flow passing through the core, and a secondary air flow bypassing the core, further comprising the step of sizing the radius of the ring to approximately equal the radial distance where the combined air flow is divided into a primary air flow and a secondary air flow.

15. The method of claim 11, further comprising the step of arranging the ring in the interior of the engine to generally coaxially surround the spinner.

* * * * *

UNITED STATES PATENT AND TRADEMARK OFFICE
CERTIFICATE OF CORRECTION

PATENT NO. : 5,649,419
DATED : July 22, 1997
INVENTOR(S) : L.A. Schaut

It is certified that error appears in the above-indentified patent and that said Letters Patent is hereby corrected as shown below:

COLUMN     LINE

| COLUMN | LINE | |
|---|---|---|
| col. 2 | Primary Examiner | After "Koczo" insert --, Jr.-- |
| 5 (Claim 1, | 51 line 13) | "spinner:" should read --spinner;-- |
| 6 (Claim 7, | 17 line 1) | "claim 8" should read --claim 1-- |

Signed and Sealed this

Thirtieth Day of December, 1997

Attest:

BRUCE LEHMAN

Attesting Officer     Commissioner of Patents and Trademarks